United States Patent Office 3,495,481
Patented Feb. 17, 1970

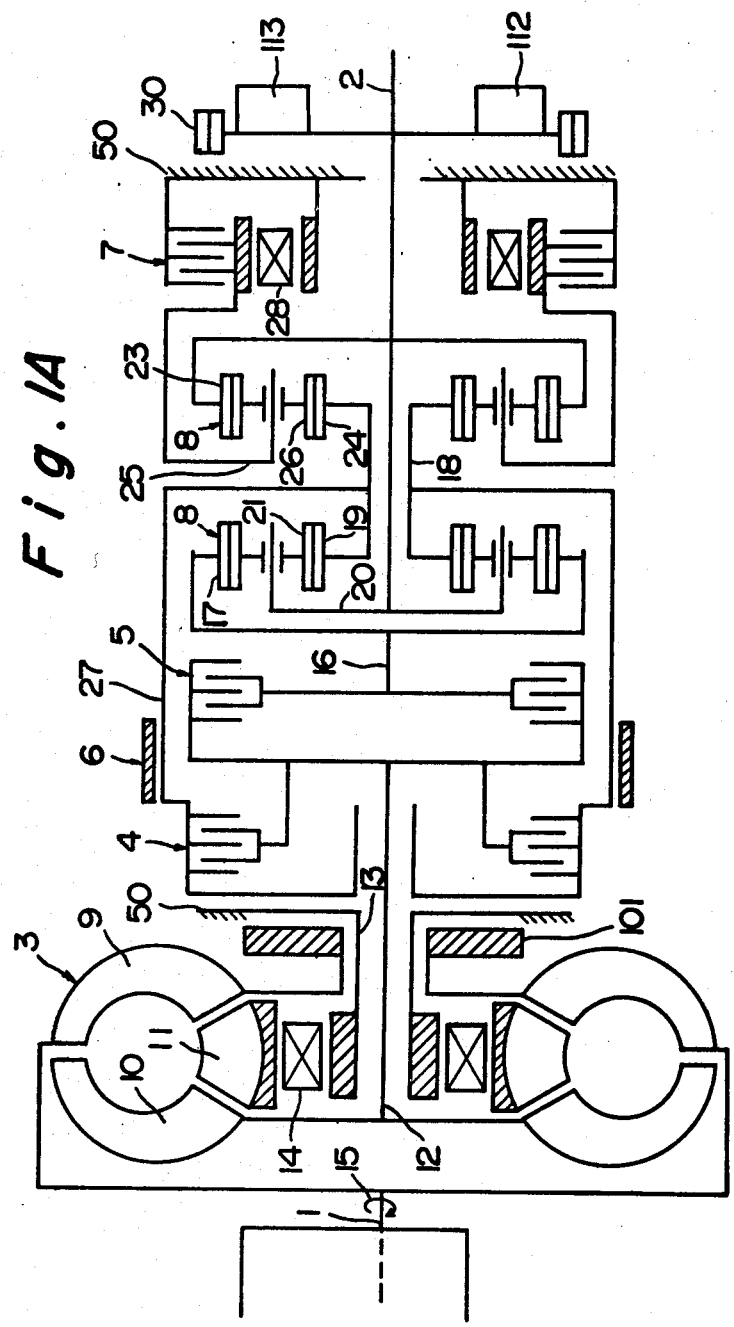

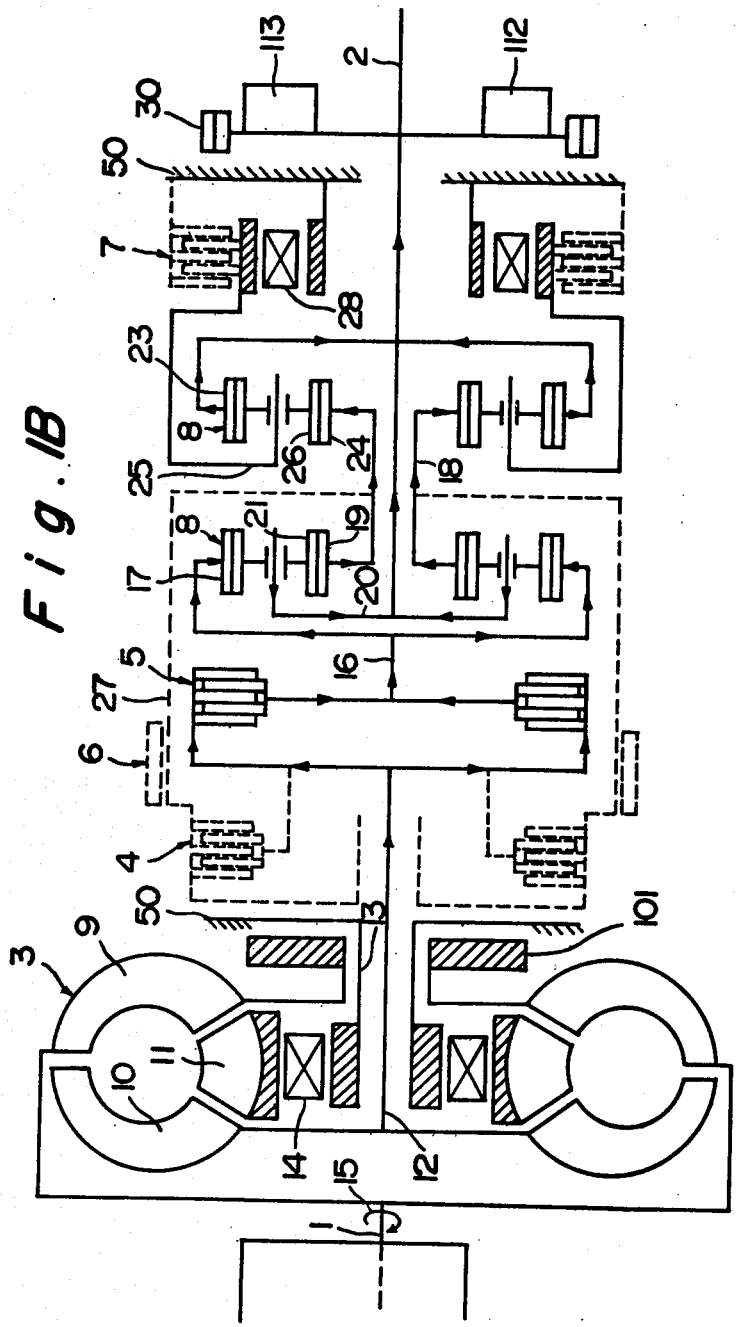

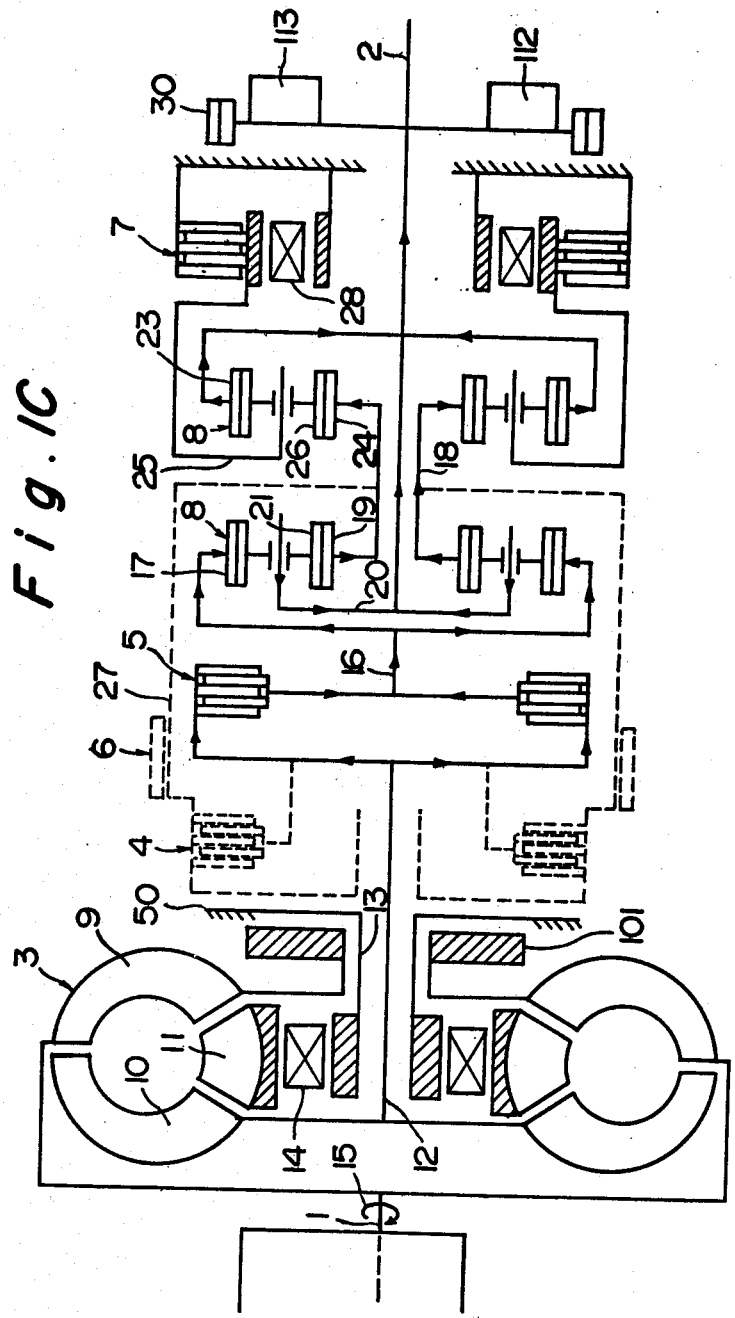

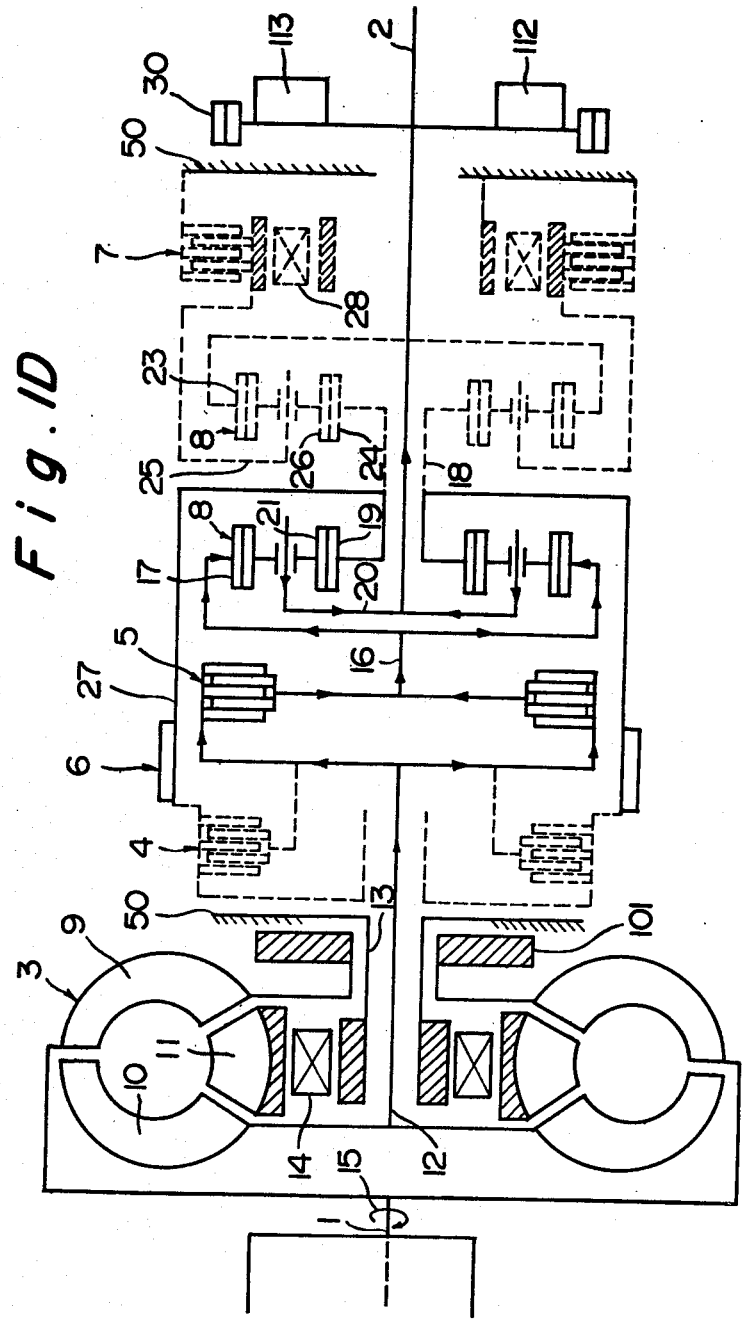

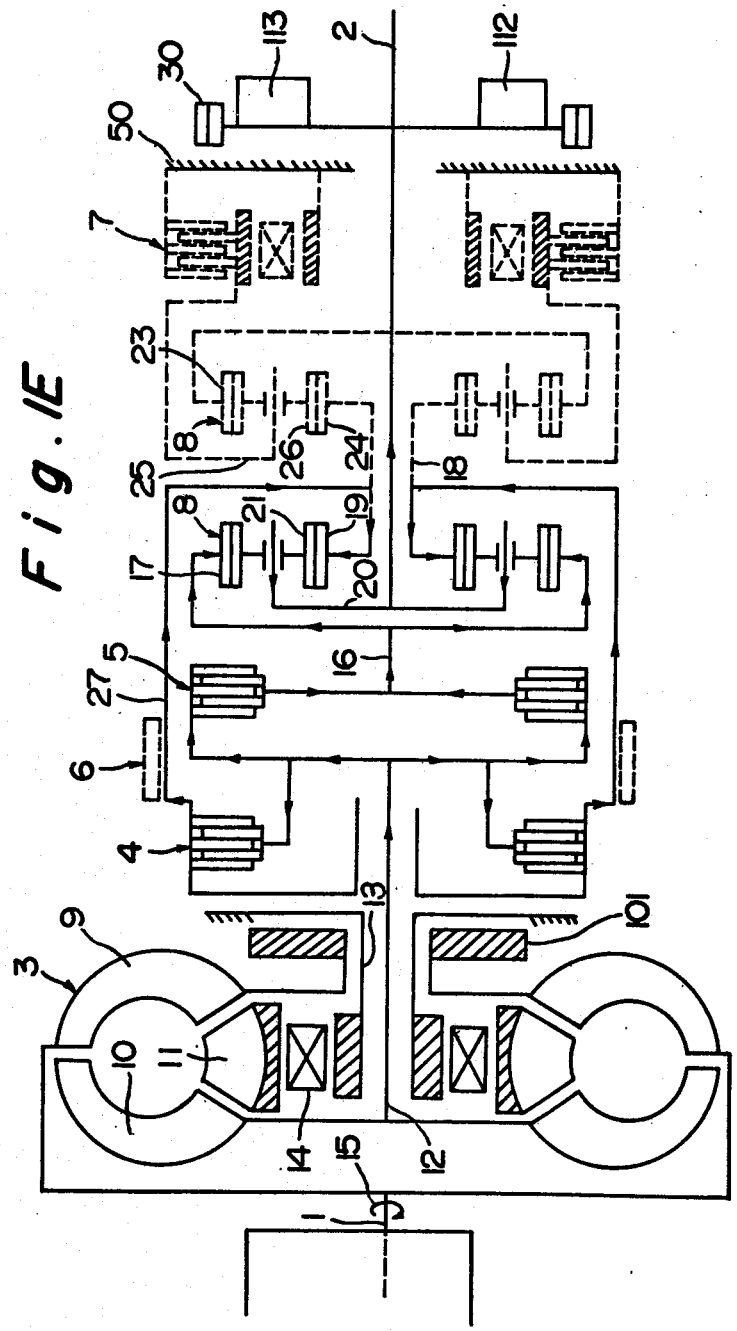

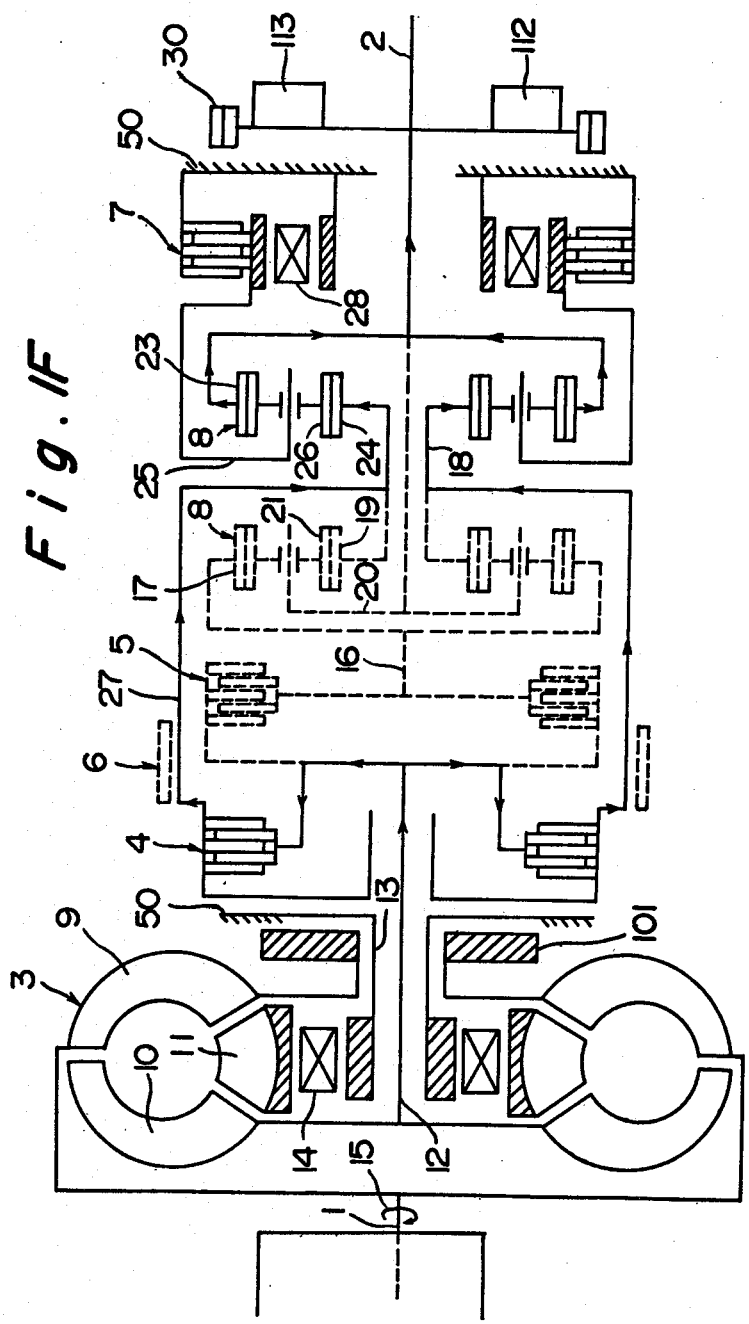

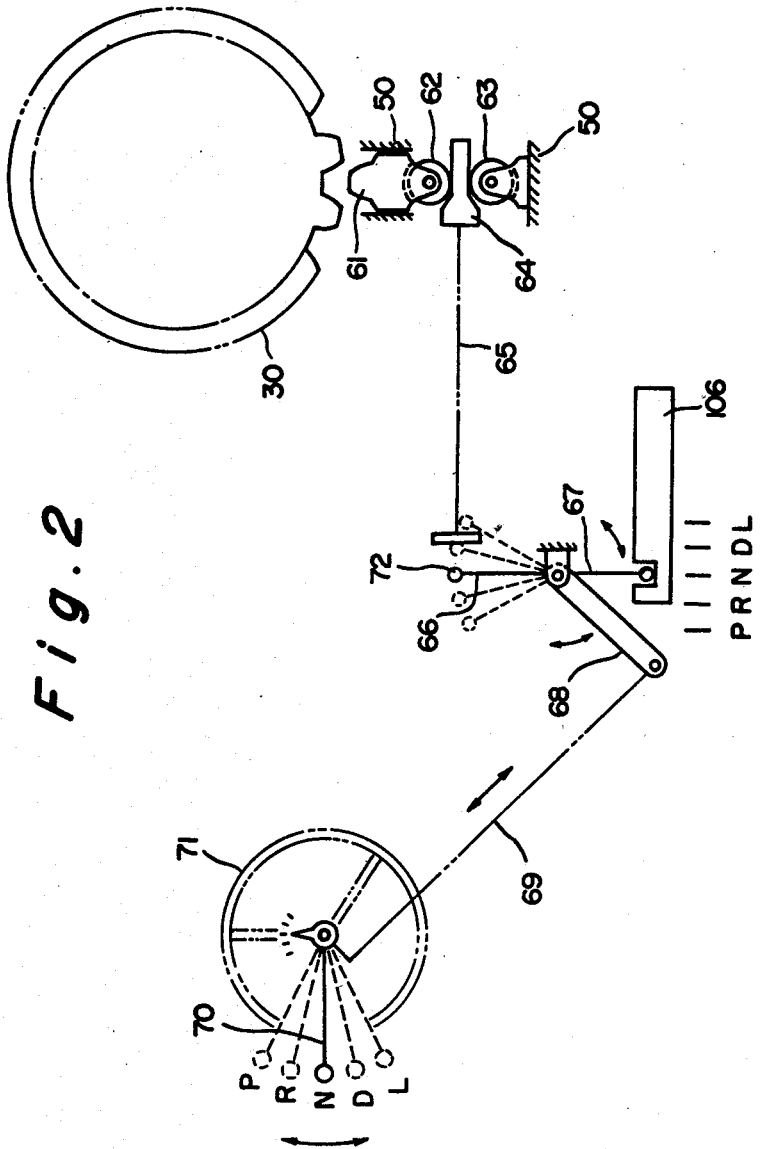

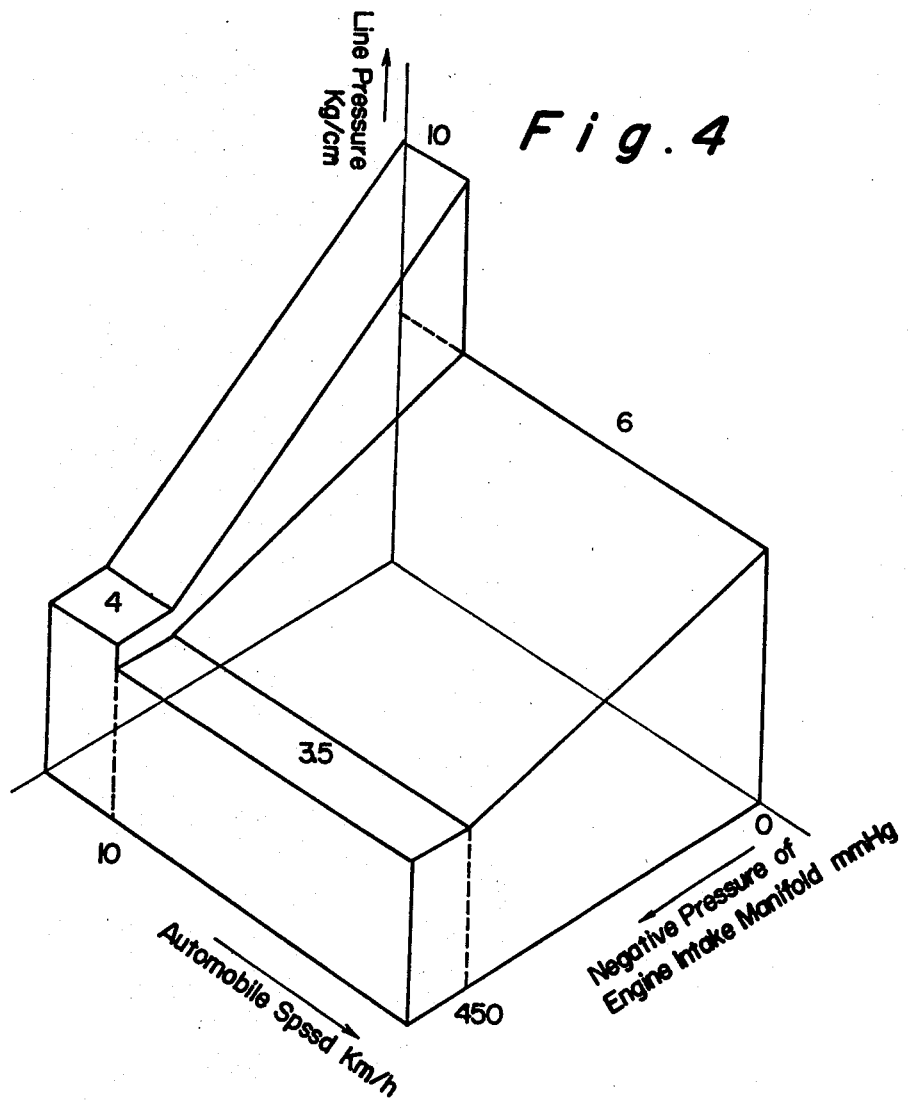

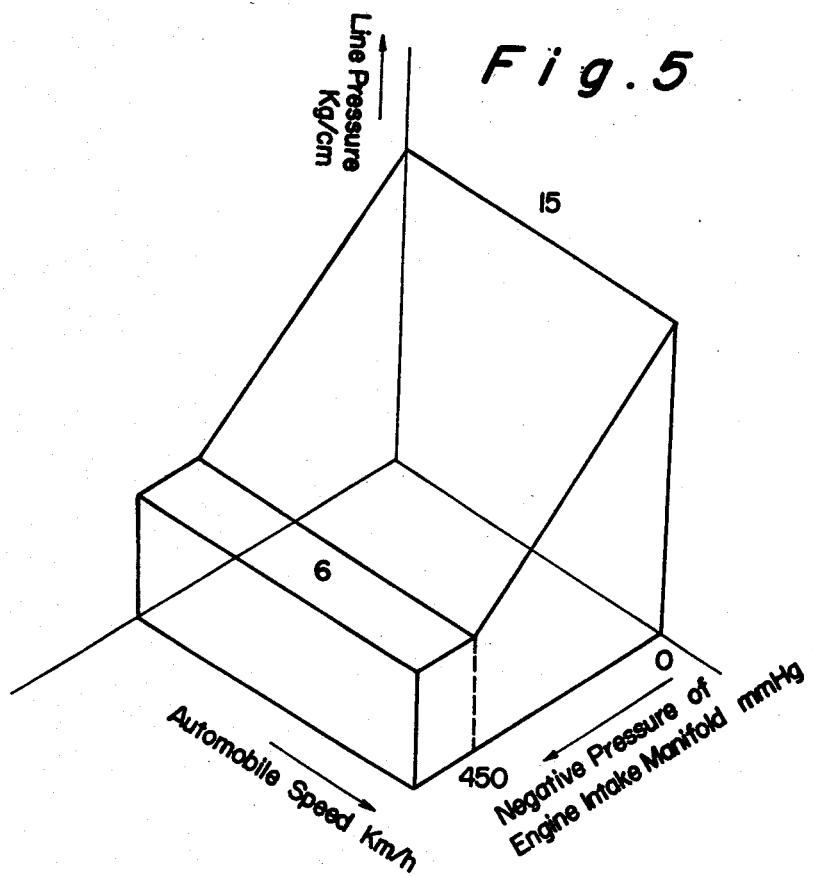

3,495,481
AUTOMATIC SPEED CHANGE GEAR CONTROL DEVICE FOR USE IN AUTOMOBILES
Koichi Ohie, Yokohama, and Yasuhiro Suzuki, Fuji, Japan, assignors to Nissan Jidosha Kabushiki Kaisha, Yokohama, Japan
Filed Nov. 6, 1967, Ser. No. 680,746
Claims priority, application Japan, Nov. 12, 1966, 41/74,052
Int. Cl. B60k 21/00
U.S. Cl. 74—864             3 Claims

ABSTRACT OF THE DISCLOSURE

An automatic speed change gear control device for use in automobiles, comprising means for detecting an automobile speed and a negative pressure in an engine intake manifold for the purpose of decreasing shocks and minimizing the driving loss of a fluid pump when the automobile speed exceeds a given speed at position D of a manually selecting valve, and means for increasing the line pressure in order to rapidly apply an engine brake and for decreasing shocks in the same manner as in the case of the position D of the manually selecting valve in case of changing over the automobile speed to a low speed at position L of the manually selecting valve.

---

The present invention relates to an automatic speed change gear control device for use in automobiles.

An automatic speed change gear comprises a hydraulic torque converter, a driving shaft, a driven shaft, a planet gear train, a one way brake, hydraulic friction clutches and brakes, a speed change control device as a control mechanism, a fluid pump as fluid pressure supply source, a mechanism for transmitting a load condition of an engine to the speed change control device, and a governor valve mechanism for detecting an automobile speed, all these means being provided for the purpose of obtaining a desired speed change gear ratio.

The invention may be applied to an automobile provided with the above-mentioned automatic speed change gear and permits of selectively locating a manually selecting lever provided at the driver's seat at position D during general forward driving travel. Thus, the speed change gear can be operated in a suitable manner in accordance with the automobile speed from the first forward driving speed to the third forward driving speed and with the degree of pushing down an accelerating pedal and thus results in an automobile travel which corresponds to circumstances.

An object of the invention, therefore, is to provide a simple and reliable fluid pressure control device, which is adapted to be constructed so as to decrease shocks to be produced at the time of speed changes in driving conditions, particularly at the position D and in response to the automobile speeds and also to the engine torque in order to minimize the driving loss of the fluid pump thereby controlling the fluid pressure in an optimum manner.

The automobile may be driven at the third forward driving speed when the automobile speed is higher than a given speed in case of locating the manually selecting lever at the position D, but it is necessary to apply an engine brake for example in case of driving down the slope. In order to apply the engine brake the manually selecting lever must be located at position L. Thus, the speed of the speed change gear is reduced to the second forward driving speed (occasionally to the first forward driving speed) to obtain the desired object. If the driver causes the manually selecting lever to locate at the position L for the purpose of applying the engine brake, it is necessary to attain the speed ratio of the speed change gear promptly without excess flip.

Another object of the invention is to provide such an improved speed change gear control device which can attain the above-mentioned requirement.

Yet another object of the invention is to provide such an improved automatic speed change gear control device which can perform the speed change at the position L from the second speed to the first speed in the same manner as that of the speed change at the position D from the second speed to the first speed and which is capable of easily applying the engine brake at the second and first speeds and of decreasing the shocks to be produced in case of changing speeds.

As can be seen from the above, the invention aims at to control the fluid pressure in the speed change gear in an optimum manner and also operate the speed change gear at the driver's own option. Thus, the speed change gear control device according to the invention may be applied not only to the forward three speed type automatic speed change gear, but also to the forward two or four speed type automatic speed change gear.

The position D of the manually selecting lever means a position where the speed change gear can automatically perform the speed change from the first forward speed to the third forward speed, while the position L of the manually selecting lever means a position where the speed of the speed change gear is forcedly reduced but not changed into the third speed. A position P of the manually selecting lever to be described later means a position where the automobile can be parked, a position R means a position where the automobile can be driven in a reverse direction; a position N means a neutral position of the speed change gear where the power of the speed change gear is cut off so that the driven shaft is not driven.

For a better understanding of the invention, reference is taken to the accompanying drawings, in which FIG. 1A is a diagrammatic illustration of a circuit arrangement of an automatic change gear control device according to the invention;

FIGS. 1B–1F show different power transmitting circuits having various speed change gear ratios obtained by the device shown in FIG. 1A;

FIG. 2 is a diagrammatic illustration of a parking mechanism adapted to be applied to the device according to the invention;

FIGS. 4 and 5 are three dimensional characteristic graphs illustrating line pressure in the speed change gear control device according to the invention.

Figure 3:
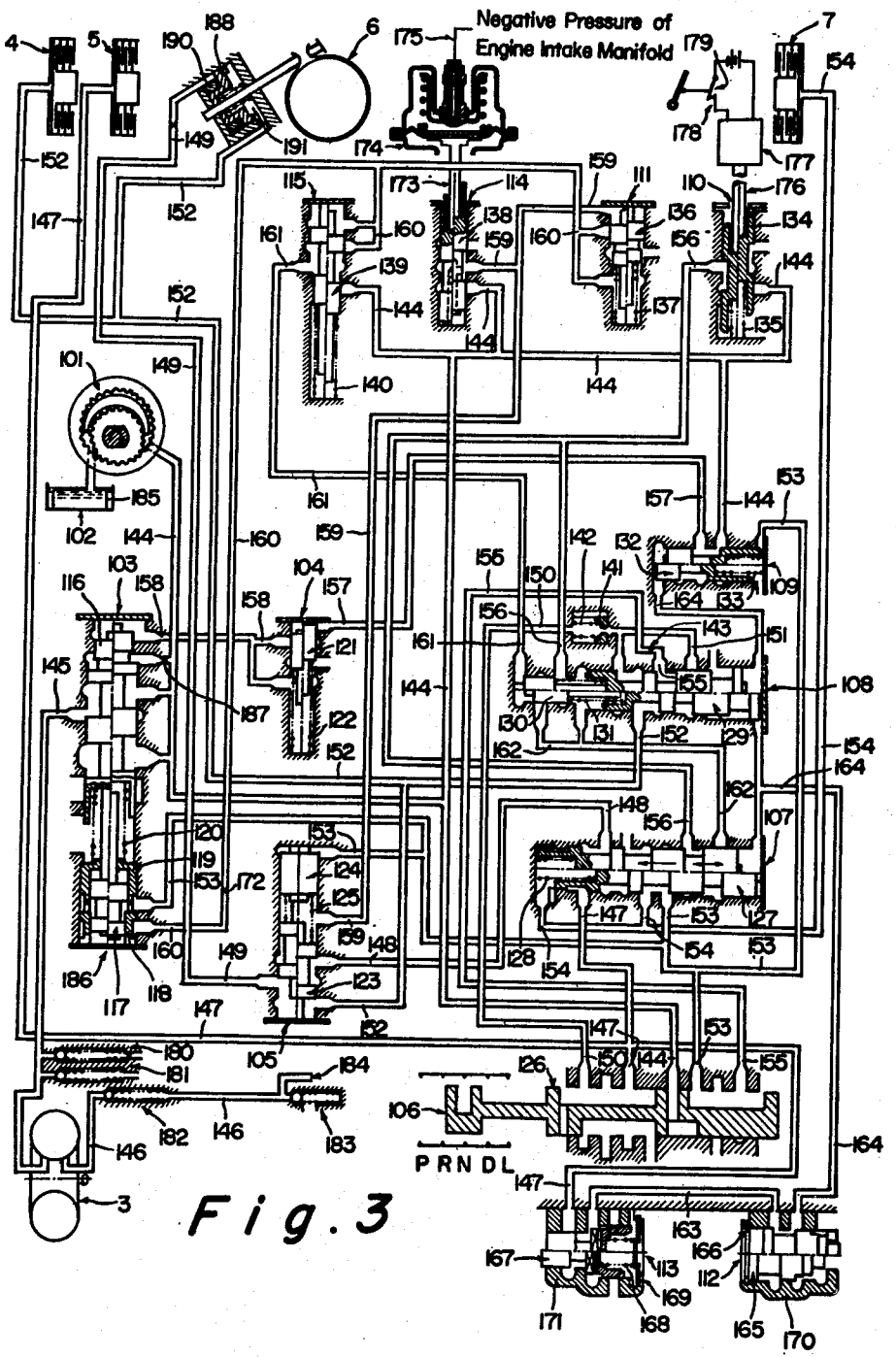
FIG. 3 shows various conduits and valves used in the speed change gear control device according to the invention.

Referring first to FIG. 1A, there is shown a power transmitting member of an automatic speed change gear having three forward driving speeds and one reverse driving speed, said member being inclusive of a driving shaft 1 driven by an engine and a driven shaft 2. The driven shaft 2 is connected through a suitable power transmitting mechanism to driving wheels (not shown). The power transmititng member further comprises a torque converter 3, hydraulic friction clutches 4, 5, hydraulic friction brakes 6, 7, planet gear train 8, and a parking gear 30 etc.

The torque converter 3 consists of a pump impeller 9, a turbine impeller 10 and a stator impeller 11, the pump impeller 9 being driven by the driving shaft 1. The turbine impeller 10 is secured to an intermediate shaft 12. The stator impeller 11 is placed through a one way brake 14 on a stationary shaft 13. The one way brake 14 is arranged such that the stator impeller 11 is capable of rotating freely in the same direction as the direction of rotation of the driving shaft 1, i.e. in a direction shown by an arrow 15, but not capable of rotating freely in the direction opposite to the direction of rotation of the driving shaft 1.

The torque converter 3 is filled therein with an operating fluid which serves to transmit the power arrived at the pump impeller 9 from the engine through the driving shaft 1 into the turbine impeller 10.

In general, the torque converter 3 is adapted to drive the turbine impeller 10 at a torque which is higher than that transmitted to the pump impeller 9. In this case the reaction force produced at the stator impeller 11 is intended to act in the direction opposite to the direction of rotation of the driving shaft 1, but the one way brake 14 serves to prevent the stator impeller 11 from being rotated in the above direction.

When the rotating speed of the turbine impeller 10 arrives at a predetermined value the reaction force produced at the stator impeller 11 acts in the same direction as the direction of rotation of the driving shaft 1 thus to freely rotate the one way brake 14 and permits the rotation of the stator impeller 11. In this case the torque converter 3 serves only as a fluid coupling.

The planet gear train 8 comprises a first planet gear train and a second planet gear train, said first planet gear train including an internal gear 17 secured to an intermediate shaft 16, a sun gear 19 secured to a hollow transmitting shaft 18, at least two planet gears 21 threadedly engaged with each of the internal gear 17 and the sun gear 19 and adapted to be rotated around the central axis thereof and also along the sun gear 19. A carrier 20 is secured to the driven shaft 2 and adapted to support the planet gears 21. The second planet gear train includes an internal gear 23 secured to the driven shaft 2, a sun gear 24 secured to the hollow transmitting shaft 18, at least two planet gears 26 threadedly engaged with each of the internal gear 23 and the sun gear 24 and adapted to be rotated around the central axis thereof and also along the sun gear 24, and a carrier 25 for supporting the planet gears 26.

The clutch 4 is arranged so as to couple the intermediate shaft 12 driven by the turbine impeller 10 with the hollow transimitting shaft 18 secured to both of the sun gears 19 and 24. The clutch 5 is arranged so as to couple the intermediate shaft 12 driven by the turbine impeller 10 with the intermediate shaft 16 secured to the internal gear 17.

The brake 6 plays a role of tightening a drum 27 thus to make the hollow transmitting shaft 18 and hence both of the sun gears 19 and 24 stationary. The brake 7 is arranged so as to make the carrier 25 for supporting the planet gears 26 of the second planet gear train stationary.

A one way brake 28 is arranged to cause the carrier 25 to be rotated in the same direction as the direction of rotation of the driving shaft 1 as shown by the arrow 15, but not to be rotated in the direction opposite to the direction of rotation of the driving shaft.

101 designates a fluid pump driven from the driving shaft 1 through the pump impeller 3 to supply the operating fluid to the various parts of the speed gear control device according to the invention.

The operation of the power transmitting member of the automatic speed change gear having three forward driving speeds and one reverse driving speed will now be described.

The power transmission train for the first forward driving speed is provided when the clutch 5 only is brought into engagement (FIG. 1B) or when both of the clutch 5 and the brake 7 are brought into engagement (FIG. 1C). When the clutch 5 only is brought into engagement the power is transmitted from the driving shaft 1 through the torque converter 3, the intermediate shaft 12 and the clutch 5 to the internal gear 17 of the first planet gear train, while the carrier 25 for the second planet gear train is prevented from being rotated in the direction opposite to the direction of rotation of the internal gear 17 by means of the one way brake 28. The internal gear 17 causes the planet gear 21 of the first planet gear train to be rotated in the same direction as the direction of rotation of the internal gear 17. The sun gear 24 of the second planet gear train adapted to be rotated in unison with the sun gear 19 rotates in the direction opposite to the direction of the internal gear 17, so that the planet gear 26 of the second planet gear train is caused to rotate in the same direction as the direction of rotation of the internal gear 17. The carrier 25 cannot be rotated in the direction opposite to the direction of rotation of the internal gear 17, so that the internal gear 23 of the second planet gear train is caused to rotate in the same direction as the direction of rotation of the internal gear 17. Thus, the driven shaft 2 adapted to be rotated in unison with the internal gear 23 is also caused to rotate in the direction of rotation of the internal gear 17, that is, in the same direction as the direction shown by the arrow 15. The carrier 20 of the first planet gear train rotates in unison with the driven shaft 2 in the direction and speed which are the same as those of the driven shaft 2, so that a reduction gear ratio for the first speed is obtained. In this first speed provided when the clutch 5 only is brought into engagement, even if the driving shaft 1 were driven by the driven shaft 2 the one way brake 28 could not be able to stop the rotation of the carrier 25 thus making the engine brake inoperative. Thus, if it is desired to apply the engine brake for the first speed, both of the clutch 5 and the brake 7 must be brought into engagement to prevent a free rotation of the carrier 25.

The power transmission train for the second forward driving speed is provided when both of the clutch 5 and the brake 6 are brought into engagement while the clutch 4 and the brake 7 are released (FIG. 1D). In this case the power is transmitted from the torque converter 3 through the intermediate shaft 12 and the clutch 5 to the internal gear 17 in the same manner as in the case of the first forward driving speed. The brake 6 causes the drum 27 to be made stationary thus preventing the rotation of the sun gear 19. The planet gear 21 is thus rotated about its own center axis and also along the stationary sun gear 19. Thus, the carrier 20 and the driven shaft 2 which is integral with the former are caused to rotate at a speed reduced but higher than the first forward driving speed and in the same direction as the direction shown by the arrow 15. Thus, a reduction gear ratio for the second speed is obtained.

The power transmission train for the third forward driving speed is provided when the clutches 4 and 5 are bought into engagement while the brakes 6 and 7 are released (FIG. 1E). In the same manner as in the case of the first and second forward driving speeds, the power transmitted from the torque converter 3 to the intermediate shaft 12 is further transmitted through one of the clutches 5 to the internal gear 17 and through the other clutch 4 to the sun gear 19. Thus, the internal gear 17, the sun gear 19 and hence the carrier 20 and the driven shaft 2 are caused to rotate in the same direction as the driving shaft 1 thereby obtaining the third speed.

The power transmission train for the reverse driving speed is provided when the clutch 4 and the brake 7 are brought into engagement while the clutch 5 and the brake 6 are released (FIG. 1F). As in the same manner as the forward driving speeds the power transmitted to the intermediate shaft 12 is further transmitted through the clutch 4 and the hollow transmitting shaft 18 to the sun gear 24 of the second planet gear train. The brake 7 causes the carrier 25 to make stationary, so that the planet gear 26 is rotated about its own center axis in the direction opposite to the direction of rotation of the sun gear 24 and not rotated along the latter. Thus, the internal gear 23 and the driven shaft 2 formed integral with the internal gear 23 are caused to rotate at a reduced speed in the direction opposite to the direction of rotation of the sun gear 24 thereby obtaining a reduction gear ratio for the reverse driving speed.

The above mentioned reduction gear ratio for each of forward and reverse driving speeds will now be explained with reference to equations.

The mutual relation between the rotating speeds of members of a simple planet gear mechanism consisting of one sun gear, one internal gear, at least two planet gears each threadedly engaging with the sun and internal gears and rotating about its own center axis and also along the sun gear, the carrier and the number of teeth is given by the equation $$n_R Z_R + n_S Z_S = n_A (Z_R + Z_S) \quad (1)$$

where:
$n$ is rotating speed,
$Z$ is number of teeth,
$R$ is internal gear,
$S$ is sun gear, and
$A$ is carrier.

In the mechanism shown in FIG. 1A, both carrier 20 of the first planet gear train and the internal gear 23 of the second planet gear train are secured to the driven shaft 2. If $n_o$ is the rotating speed of the driven shaft 2, $n_S$ the rotating speed of the sun gears 19, 24 of the first and second planet gear trains, $n_R$ the rotating speed of the internal gear 17 of the first planet gear train, $n_A$ the rotating speed of the carrier 25 of the second planet gear train, and $Z_r$, $Z_s$ numbers of teeth of the internal gears 17, 23 and of the sun gears 19, 24 for the first and second planet gear trains, respectively, the equation 1 is given by the following simultaneous equations $$n_R Z_R + n_S Z_S = n_o (Z_R + Z_S) \quad (2)$$

$$n_o Z_R + n_S Z_S = n_A (Z_R + Z_S) \quad (3)$$

The above Equations 2 and 3 make it possible to explain each reduction gear ratio as in the following manner.

The first forward driving speed:

Since the carrier 25 of the second planet gear is made stationary by means of one way brake 28 or the brake 7 $n_A = 0$. Thus, the following equation can be deduced from the Equations 2 and 3 by eliminating $n_S$ therefrom $$\frac{n_R}{n_o} = 2 + \frac{Z_S}{Z_R}$$

That is, $n_R$ is the input rotating speed, so that the reduction gear ratio of the first forward driving speed is given by $$\left(2 + \frac{Z_S}{Z_R}\right)$$

The second forward driving speed:

The sun gears 19, 24 of the first and second planet gear trains are made stationary by means of the brake 6, so that $n_S = 0$. Thus, the following equation is given by the equation 2

$$\frac{n_R}{n_o} = 1 + \frac{Z_S}{Z_R}$$

In this case $n_R$ is also the input rotating speed, so that the reduction gear ratio of the second forward driving speed is given by $$\left(1 + \frac{Z_S}{Z_R}\right)$$

The third forward driving speed:

Both of the clutches 4, 5 are brought into engagement so that the internal gear 17 and the sun gear 19 of the first planet gear train are caused to rotate at the same rotating speed. That is, $n_R = n_S$. Thus, the following equation is given by the Equation 2

$$n_R = n_S = n_o$$

Both of $n_R$, $n_S$ are the input rotating speed and $n_o$ is the output rotating speed, so that the reduction gear ratio at the third forward driving speed is 1.

Reverse driving speed:

The carrier 25 of the second planet gear train is made stationary by means of the brake 7 and hence $n_A = 0$, so that the following relation is given by the Equation 3

$$\frac{n_S}{n_o} = -\frac{Z_r}{Z_s}$$

Since $n_S$ i.e. the rotating speed of the sun gear is the input rotating speed, the reduction gear ratio at the reverse driving speed is $$\left(-\frac{Z_r}{Z_s}\right)$$

where the negative sign means that the direction of rotation of the driven shaft is opposite to that of the input.

FIG. 2 is a diagrammatic illustration of a parking mechanism for use in the automatic speed change gear control device according to the invention. 30 designates the parking gear shown in FIG. 1; 50 a portion of the gear transmission casing; 106 a manually selecting valve of the speed change gear control device to be described later; 61 a pawl adapted to make the parking gear 30 and the driven shaft 2 secured thereto stationary; and 62 a roller rotatably mounted at the pawl 61 by means of a pin.

64 illustrates a wedge adapted to move upwards the roller 62 and the pawl 61 until the latter becomes threadedly engaged with the parking gear 30; 65 a plunger secured to the wedge 64; 66 an arm for operating the plunger 65 at the position P of the manually selecting valve 106 in a manner to be described later; 67 an arm for selectively locating the manually selecting valve 106 at a given position thereof; and 68 a lever interlinked through a suitable link mechanism 69 with a manually selecting lever 70 arranged near a driver's steering wheel 71 and adapted to operate the arms 66 and 67. If the manually selecting lever 70 is selectively located by the driver at the parking position P, the manually selecting lever 106 is caused to move towards the position P through the link mechanism 69, the lever 68 and the arm 67. At the same time the free end 72 of the arm 66 causes the plunger 65 and hence the wedge 64 to move towards the right direction and hence move the roller 62 and the pawl 61 upwards thereby making the parking gear 30 stationary. In FIG. 2 the manually selecting lever 70 is arranged near the driver's steering wheel 71, but it may be arranged on the floor near the drivers' seat and interlocked through a suitable link mechanism with the lever 68.

The invention will now be described with reference to FIG. 3.

The fluid pump 101 serves as a fluid supply source for supplying fluid to the speed change gear control device, the clutches 4, 5, the brakes 6, 7, the torque converter 3 and the other parts to be lubricated. The fluid pump 101 is adapted to be driven from the driving shaft 1 through the pump impeller 9 of the torque converter. During the operation of the engine the fluid pump 101 operates to suck up the fluid from a fluid sump 102 arranged at the bottom of the transmission gear casing 50 through a strainer 185 adapted to remove undesirable dust and dirt and a suction port formed in the casing and deliver it to a circuit 144. The fluid pressure in this circuit 144 is adjusted to a given pressure by means of a line pressure regulating valve 103 comprising a spool 116 and a spring 120. The spool 116 is subjected to the force of the spring 120. The throttle pressure in a circuit 160 and the line pressure in a circuit 153 act through a spool 117 of a pressure intensifying valve 186 on the spool 116 and counteract against the pressure acting on the upper part of the spool 116 from the circuit 144 through an orifice 187 and also counteract against the pressure acting on the upper part of the spool 116 from a circuit 158.

The fluid pressure for operating the torque converter 3 is fed from the circuit 144 through the line pressure regulating valve 103 to a circuit 145 and maintained at a converter operating pressure with the aid of a relief valve 181 incorporated in the casing of the fluid pump 101. The fluid pushed out of the torque converter 3 is fed into a circuit 146 and maintained at a converter operating pressure with the aid of a pressure maintaining valve 182. The fluid flows from the circuit 146 through an aperture formed in the transmission gear casing 50 to a rear member 184 to be lubricated of the power transmission gear. If this lubricating fluid pressure becomes excessive, a relief valve 183 is opened to decrease the pressure. The fluid is also fed from the circuit 145 through an orifice of an open lubricating valve 180 to a front member to be lubricated of the power transmission gear.

The manually selecting valve 106 is not provided with springs, but comprises a spool 126 which at each selected position serves to deliver the line pressure introduced from the circuit 144 into any desired circuit from circuits 147, 150, 153 and 155. The line pressure in the circuit 144 is introduced into the circuits 147, 150, 153, and 155 in response to the selected position of the spool 126 as listed in the following table.

TABLE

|            | Circuit 147 | Circuit 150 | Circuit 153 | Circuit 155 |
|------------|-------------|-------------|-------------|-------------|
| D position | O           | O           |             |             |
| L position | O           |             | O           |             |
| R position |             |             | O           | O           |
| P position |             |             | O           |             |
| N position |             |             |             |             |

The circuit 147 is communicated with a second governor valve 113, a 1.2 shift valve 107 and the clutch 5.

To the driven shaft 2 are secured a first governor valve 112 and the second governor valve 113 communicated with the line pressure circuit 147 extending through the transmission gear casing 50. The governor pressure adjusted by the second governor valve 113 is fed through a circuit 163 into the first governor valve 112. When a spool 165 of the first governor valve 112 arrives at its open position, the circuit 163 becomes communicated with a circuit 164 which causes the governor pressure to introduce through the transmission gear casing 50 into the change gear control device. The circuit 164 is communicated with the end face of the 1.2 shift valve 107, the end face of a 2.3 shift valve 108 and the end face of a cut-back valve 109, respectively.

The 1.2 shift valve 107 comprises a spool 127 and a spring 128 and is communicated with the line pressure circuits 147, 153 and 156 and with a throttle system circuit 162, the line pressure being delivered from the circuit 147 into a circuit 148 and from the circuit 153 into the circuit 154. The circuit 148 is communicated with a 2.3 back-out valve 105, while the circuit 154 is communicated with the spring side of the 1.2 shift valve 107 and with the brake 7.

The 2.3 shift valve 108 comprises a spool 129 whose one end being subjected to actions of both of a pressure reducing throttle valve 130 and a spring 131. The 2.3 shift valve 108 is communicated at its inlet with line pressure circuits 151, 155 and at its outlet with a circuit 152 which is communicated with the 2.3 back-out valve 105, with the clutch 4, and the releasing side 191 of a servo-piston 188 of the brake 6. The throttle reducing valve 130 is communicated with a throttle system circuit 161, with a circuit 162 adapted to receive the reduced fluid pressure from the circuit 161, and with a line pressure circuit 156. The cut-back valve 109 comprises a spool 132 and a spring 133 and is communicated at each end with governor pressure circuit 164 and line pressure circuit 153, respectively. The line pressure circuit 144 is selectively communicated with or interrupted from the circuit 157 by means of the cut-back valve 109.

A solenoid down shift valve 110 comprises a spool 134 and a spring 135 and is connected through a plunger 176 to a down shift solenoid 177. The solenoid down shift valve 110 is communicated at its inlet with the line pressure circuit 144 which can also be changed over to a line pressure circuit 156. A down shift solenoid 177 is provided at its electric circuit with a switch 179 adapted to be closed when the driver pushes down an accelerating pedal to cause it to be passed over a given position and move the plunger 176 downwards.

A second throttle valve 111 comprises a spool 136 and a spring 137 and communicated at its inlet with a throttle system circuit 159. The fluid adjusted by the second throttle valve 111 is delivered from a throttle system circuit 160 and also introduced into the end face at the spring 137. The circuit 160 is communicated with a throttle pressure intensifying valve 115 and the pressure intensifying valve 186.

A first throttle valve 114 comprises a spool 138 and is connected through a plunger 173 to a vacuum diaphragm 174 which is connected through a conduit 175 to an engine intake manifold. The first throttle valve 114 is communicated at its inlet with the line pressure circuit 144 to cause the adjusted throttle system pressure to be delivered to a circuit 159 which is communicated with the second throttle valve 111 and with the 2.3 back-out valve 105.

The throttle pressure intensifying valve 115 comprises a spool 139 and a spring 140 and is communicated at its inlet with the throttle system circuit 160 and with the line pressure circuit 144. The fluid intensified by the valve 115 is delivered to a throttle system pressure circuit 161 communicated with the throttle pressure reducing valve 130.

A pressure reducing valve 104 comprises a spool 121 and a spring 122 and is communicated at its inlet with the line pressure circuit 157 to deliver the reduced pressure fluid into a pressure circuit 158 communicated with the line pressure regulating valve 103.

The 2.3 back-out valve 105 comprises a spool 123, a spring 125 and a manual low plug 124 and is communicated at its inlet with the line pressure circuits 148, 152, 153 and with the throttle system circuit 159 to deliver the fluid into a line pressure circuit 149 communicated with the tightening side of the brake 6.

The operation of the hydraulic control device shown in FIG. 3 is as follows:

When the operator shifts the manually selecting valve 106 to the automatic three speeds forward position D, circuits 147 and 150 communicate to the line pressure circuit 144. The line pressure supplied through circuit 147 engages the friction clutch 5 through all of the three forward drive speeds. Further, circuit 147 communicates to the 1.2 shift valve 107 and the second governor valve 113. The line pressure through the circuit 150 is supplied to the 2.3 shift valve 108.

The spool 127 of the 1.2 shift valve is kept to the rightward position at first speed ratio and blocks the circuit 147 from communication with any other circuit. Thus, only the friction clutch 5 is engaged through circuit 147 and the vehicle is driven forward at the first speed ratio due to the engagement of the one-way brake 28. In this case, as one-way brake 28 is effective, the engine drives the wheels, but the wheels cannot drive the engine, so that engine brake function is not effective owing to free rotation of the one-way brake 28. As the vehicle speed increases, governor pressure through circuit 164 also increases to urge the spool 127 of the 1.2 shift valve 107 leftward, so that circuit 147 communicates to circuit 148. As the spool 129 of the 2.3 shift valve 108 is in the rightward position, circuit 152 is exhausted through circuit 155, so that the spool 123 of the 2.3 back-out valve 105 is lowered by the spring 125 to communicate circuit 148 with circuit 149 through 2.3 back-out valve 105. Thus, line pressure is applied through circuits 147, 148 and 149 to the actuating chamber 190 of the hydraulic servo 188 to engage the friction brake 6. Thus, second speed ratio is attained.

As the vehicle speed further increases, governor pressure through circuit 164 is increased sufficiently to urge the valve spool 129 of 2.3 shift valve 108 leftward to communicate passage 150 to circuit 152 through a groove of the valve spool 129. Line pressure through circuit 152 is supplied to engage the friction clutch 4 and also to the release side chamber 191 of the hydraulic servo 188 to release the friction brake 6. By providing area difference between the chambers 188 and 191, the friction brake is released when both chambers 188 and 191 are supplied by line pressure, so that smooth shift process between the 2nd and 3rd speed ratio is attained. Thus the power transmission mechanism is driven by 3rd speed ratio or direct coupling.

When the operator selects the lower speed range limiting position L by shifting the manually selecting valve 106, line pressure through circuit 144 is communicated to circuits 147 and 153. As before, line pressure through circuit 147 acts to engage the friction clutch 5 all through the position L. Line pressure through circuit 153 communicates to circuit 154 when the 1.2 shift valve 107 is in the rightward position so that the friction brake 7 is engaged. Thus 1st speed ratio is obtained. If the 1.2 shift valve 107 is kept leftward by governor pressure through circuit 164, when the manual selecting valve 106 selects the position L from other positions, circuit 147 communicates through circuit 148, the 2.3 backout valve 105 and circuit 149 to engage side chamber 190 of the hydraulic servo 188 to engage the friction brake 6. As the manual low plug 124 of the 2.3 backout valve 105 is urged downward by line pressure through circuit 153, the spool 123 is kept downward to communicate circuits 148 and 149. Thus 2nd speed ratio is attained. By the position L, circuit 150 and 155 communicating to circuit 152 are exhausted so that 3rd speed ratio cannot be attained because the friction clutch 4 cannot be engaged. When the 1.2 shift valve 107 is urged to rightward, 1st speed ratio is attained, as circuit 148 is exhausted, and line pressure through circuit 154 now communicating to circuit 153 urges the valve spool 127 from left end surface thereof, so that 1st speed ratio is maintained. In this case, as the friction brake 7 is engaged, the planet carrier 25 of the rear planetary gear unit is clamped to both directions, so that engine brake function can be obtained.

When the manually selecting valve 106 is shifted to reverse drive position R, line pressure through circuit 144 is supplied to circuits 153 and 155. Line pressure through circuits 153 and 154 is applied to engage the friction brake 7 as before, and line pressure through passage 155 is communicated through the 2.3 shift valve 108 and circuit 152 to engage the friction clutch 4. As no governor pressure is applied to shift valves 107 and 108, the spools are kept rightward. Thus the output shaft 2 of the power transmission mechanism rotates in reverse direction.

The governor valve assembly 112 and 113 is adapted to supply hydraulic pressure representing the vehicle speed to passage 164. The governor pressure through passage 164 is supplied to the 1.2 shift valve 107 and the 2.3 shift valve 108 to urge the valve spools 127 and 129 respectively, as described before, when the vehicle speed exceeds respective predetermined values, so that the communication passages of the line pressure are changed to effect automatic shifting from 1st through 3rd speed ratios. Also, the circuit 164 is communicated to the left end surface of spool 132 of the cut-back valve 109 to regulate hydraulic pressure actuating the friction elements as will be explained in more detail hereinafter.

As the acceleration pedal is depressed deeply, the switch 178 of the solenoid down-shift valve 110 is closed to energize the solenoid 177 and thus actuate rod 176 to urge the valve spool 134 downward, so that line pressure through circuit 144 communicates to circuit 156 which is normally exhausted. Fluid pressure through circuit 156 communicates to a groove between area difference lands of the 1.2 shift valve 107 to urge the spool 127 rightward when the spool 127 is shifted leftward. Also, the circuit 156 communicates to left end surface of the spool 129 of the 2.3 shift valve 108 to urge the spool 129 rightward. Consequently, the valve spool 129 or 127 will move rightward when the urging force overcome the biasing force of the governor pressure through circuit 164, so that downshifts from 3rd to 2nd or from 2nd to 1st speed ratio will be obtained.

The first throttle valve 114 supplies regulated pressure representing engine torque to circuit 159. The circuit 159 is communicated with the 2.3 backout valve 105 to urge the spool 123 downward to communicate the circuits 148 and 149 and to allow circuit 152 to exhaust at down-shift. The circuit 159 is also communicated to the second throttle valve 111 and the modulated pressure is supplied through circuit 160 to lower end of the pressure intensifying valve 186 to increase line pressure as a function of engine torque. The throttle pressure through circuit 160 is increased in the throttle pressure intensifying valve 115 and is supplied through circuit 161 to left end surface of the reducing valve 130 to bias the spool 129 of the 2.3 shift valve 108 rightward. The reduced throttle pressure through circuit 162 is supplied between area difference lands of the spool 127 to retain the spool 127 of the 1.2 shift valve 107 rightward when the 2.3 shift valve 108 is rightward position. Thus vehicle upshift speed is increased when engine torque is high.

The line pressure regulator valve assembly 103 and 186 consists of the line pressure regulator valve 103 and the pressure intensifying valve 186 which is assembled in line with the spool 116. Fluid pressure produced by the fluid pump 101 is introduced through circuit 144 and urges the spool 116 downward by the area difference between the lands against the biasing spring 120. When the fluid pressure through circuit 144 is higher beyond a predetermined value, the spool 116 is urged downward to open communication between circuits 144 and 145 and supply torque converter working fluid as previously mentioned. When the fluid pressure is further increased, the spool 116 moves downward further and opens an exhaust port to leak off a portion of fluid and reduce the hydraulic pressure in the circuit 144. Thus, an equilibrium is produced between the urging hydraulic force and the biasing spring force, and consequently, the fluid pressure in circuit 144 is regulated to desired line pressure.

The line pressure intensifying valve 186 biases the spool 116 of the regulator valve 103 by the spool 117 when fluid pressure is applied to lower end surface through circuit 160, or between area difference lands through circuit 153, so that line pressure increases to attain equilibrium between the forces. On the contrary, when fluid pressure is applied to the upper end surface of the spool 116 of the regulator valve 103 through circuit 158 to urge the spool 116 downward, the regulated line pressure through circuit 144 is decreased correspondingly to attain equilibrium again.

The upper end surface of the spool 116 of the line pressure regulator valve 103 is normally exhausted through circuit 158 and the pressure reducing valve 104, as the spool 121 thereof is kept upper position. However, when the vehicle speed is increased, governor pressure through circuit 164 is also increased to urge the spool 132 of the cut-back valve 109 to the right. Thus circuits 144 and 157 are communicated so that pressure through circuit 157 urges the spool 121 downward and to apply reduced fluid pressure through circuit 158 to upper end surface of the spool 116 of the pressure regulating valve 103. Consequently line pressure through circuit 144 decreases stepwise. When circuit 153 is supplied with line pressure, i.e., at position L or R, the spool 132 of the cut-back valve 109 is kept leftward, so that line pressure is not decreased stepwise.

The operation of the device according to the invention will now be explained.

If the manually selecting valve 106 is located at the position D where the forward driving is effected, the fluid pressure introduced from the throttle pressure circuit 160 into the pressure intensifying valve 186 is subjected to the spring 120 of the line pressure regulating valve 103 and to the spool 117 and is made in balance with the fluid pressure introduced from the orifice 187 to control the line pressure. In this case the fluid in the circuit 153 is relieved at the manually selecting valve 106. In such condition if the rotating speed of the driven shaft 2 becomes higher than a given speed the governor pressure introduced into the circuit 164 acts on the cut-back valve 109 to push the spool 132 towards right side against the action of the spring 133 thus delivering the line pressure in the circuit 144 into the circuit 157.

The line pressure introduced into the circuit 157 acts on the pressure reducing valve 104 to reduce the pressure by a given value determined by the action of the spring 122 and hence deliver the reduced pressure into the circuit 158. This reduced pressure fluid acts on the upper end of the line pressure regulating valve 103.

Thus, when the driven shaft 2 arrives at a speed higher than the given speed, the balanced state of the line pressure regulating valve 103 obtained by the throttle pressure, the force of the spring 120 and the line pressure introduced from the orifice 187 is shifted to a balanced state obtained by the throttle pressure, the force of the spring 120, the line pressure introduced from the orifice 187 and the reduced line pressure introduced from the circuit 158.

If the manually selecting valve 106 is located at the position D and the rotating speed of the driven shaft 2 arrives at a speed higher than the given speed, the line pressure corresponding to the throttle pressure which is function of the negative pressure of each engine intake manifold is reduced by the given value. In this way it is ensured not only that the shock produced when the speed is changed at the position D will be decreased but also that the driving loss of the fluid pump will be minimized. This relation is shown by a graph in FIG. 4.

When the automobile speed becomes increased and the rotating speed of the driven shaft 2 arrives at the given value, the speed change gear is maintained at the third forward driving state. In this case the line pressure is transmitted from the grooves in the spool 126 of the manually selecting valve 106 through the circuits 144, 150 and the spool 129 of the 2.3 shift valve 108 pushed towards the left side thereof to the circuits 150, 152 and acts on the release side 191 of the brake 6 so as to release the brake 6. The clutches 4, 5 are brought into engagement by means of the line pressure fluid in the circuits 152, 147. If the driver causes the speed change gear to move from the position D to the position L in order to apply the engine brake, the line pressure in the circuit 150 is discharged from the manually selecting valve 106 so that the line pressure in the circuit 152 acts to release the clutch 4. At the same time the pressure in the releasing side 191 of the servo-piston 188 of the brake 6 is discharged to bring the brake 6 into engagement by means of the pressure in the applying side 190. The line pressure in the manually selecting valve 106 is introduced from the circuit 144 into the circuit 153 and acts on the spool 117 of the pressure intensifying valve 186 to increase the line pressure while at the same time acts on the right side of the cut-back valve 109 to push back the spool 132 to the left side against the governor pressure in the circuit 164 with the aid of the action of the spring 133. That is, at the position D of the third forward driving speed state the governor pressure in the circuit 164 acts to overcome the action of the spring 133 to push the spoon 132 towards the right side. Thus, the line pressure acts from the circuit 144 through the circuit 157 and the pressure reducing valve 104 on the upper end of the line pressure regulating valve 103 thus to reduce the line pressure to a value lower than that at the starting state. But, if the driver causes the speed change gear to move from the position D to the position L, the above mentioned cut-back effect becomes not effective to decrease the line pressure. This relation is shown by a graph in FIG. 5. Thus, the device according to the invention makes it possible to increase the line pressure at the moment when the driver causes the speed change gear to move from the position D to the position L and hence change the third speed to the second speed, thereby rapidly bringing the brake 6 into engagement and considerably decreasing the time lag required to start the operation of the engine brake.

As above mentioned, at the third forward driving speed, if the driver selects the position L the second forward driving speed can be obtained. But, if the automobile speed is further decreased, that is, if the rotating speed of the driven shaft 2 becomes lower than a given speed the first forward driving speed can be obtained. In this case, unless the driver pushes down the accelerating pedal lower than a given position, the spool 134 of the solenoid down shift valve 110 could not be displaced lower and hence the line pressure in the circuit 144 is not permitted to be introduced into the circuit 156. Thus, the line pressure in the circuit 156 acting on the 1.2 shift valve 107 is interrupted. Moreover, the spool 127 of the 1.2 shift valve 107 plays a role of interrupting an introduction of the line pressure in the circuit 153 into the circuit 154. Thus, at the high automobile speed, it is impossible to displace the spool 127 towards the right side against the governor pressure acting on the right side end thereof. In other words, the speed change from the second speed into the first speed at the position L can be effected in the same manner as in the speed change from the second speed into the first speed at the position D.

If the speed change from the second speed into the first speed is effected at the position L, the line pressure introduced from the circuit 153 into the circuit 154 together with the force of the spring 128 acts on the left side end of the 1.2 shift valve 107, while the line pressure in the circuit 147 acts on the spool 127 so as to push it towards the right side thereof. Thus, even if the automobile speed becomes increased and hence the governor pressure introduced into the circuit 164 becomes increased, the governor pressure could not exceed the line pressure, so that the spool 127 could not be displaced towards the left side thereof. Thus, it is impossible to change the speed ratio from the first speed to the second speed at position L.

It will be appreciated that the invention is not limited to the embodiments described and that within the scope of the invention, many modifications are possible for a person skilled in the art.

What we claim is:

1. An automatic speed change gear control device for an automatic transmission of the type having a hydraulic torque converter, a driving shaft, a planet gear train, hydraulic friction clutches and brakes; said speed change control device comprising a fluid pressure supply source driven by said driving shaft, a line pressure regulating valve means for regulating the pressure of the fluid supplied by said fluid pressure supply source, a line pressure intensifying valve means acting on one end of said line pressure regulating valve means to increase the line pressure, a fluid pressure operated valve means including a manually selecting valve means having a Drive position and a Low position, said fluid pressure operated valve means being connected with the output of said fluid pressure supply source, an engine load condition responsive means connected between the output of said fluid pressure supply source and said line pressure intensifying valve means to vary the pressure of the operating fluid in response to changes in the engine load, said pressure intensifying valve means having a first and a second land, the end surface of said first land being subjected to a pressure determined by said engine load condition sensing means and said second land in communication with said manually selecting valve means, an output speed sensing means connected with said fluid pressure operated valve means, a pressure cut-back valve means connected with said line pressure regulating valve means and with said output speed sensing means to vary the pressure of said fluid supply in response to a pressure determined by said output speed sensing means; a first conduit means connecting said supply source to said manually selecting valve means, a second conduit means connecting said pressure cut-back valve means to another end of said line pressure regulating valve means, and a third conduit means connecting said manually selecting valve means to that side of said cut-back valve means which is opposite to the side subjected to the pressure of said output speed sensing means, whereby when said manually selecting valve means is moved from Drive position to Low position, said first conduit means is connected to said third conduit means to apply the line pressure to that side of said cut-back valve means which is opposite to the side subjected to the pressure of said output speed sensing means, and said first conduit means is disconnected from said second conduit means, to exhaust the line pressure applied to one side of said line pressure regulating valve means, thus causing the line pressure to be increased to a value which is the same as that kept at a vehicle speed lower than the given vehicle speed.

2. An automatic speed change gear control device for an automatic transmission of the type having a hydraulic torque converter, a driving shaft, a driven shaft, a planet gear train, hydraulic friction clutches and brakes; said speed change control device comprising a fluid pressure supply source driven by said driving shaft, a line pressure regulating valve means for regulating the pressure of the fluid supply by said fluid pressure supply source, a line pressure intensifying valve means acting on one end of said line pressure regulating valve means to increase the line pressure, a fluid pressure operated valve means including a manually selecting valve means having a Drive position and a Low position, said fluid pressure operated valve means being connected with the output of said fluid pressure supply source, an engine load condition responsive means connected with the output of said fluid pressure supply source and with said line pressure intensifying valve means to vary the pressure of the operating fluid in response to changes in the engine load, said line pressure intensifying valve means having a first land and a second land, the end surface of said first land being subjected to a pressure determined by said engine load condition responsive means, an output speed sensing means connected with said fluid pressure operated valve means, a pressure cut-back valve means connected with said line pressure regulating valve means and with said output speed sensing means to vary the pressure of said fluid supply in response to a pressure determined by said output speed sensing means; a first conduit means connecting said fluid supply source to said manually selecting valve means, a second conduit means connecting said pressure cut-back valve means to another end of said line pressure regulating valve means, a third conduit means connecting said manually selecting valve means to that side of said pressure cut-back valve means which is opposite to the side subjected to said output speed sensing means, and a fourth conduit means connecting said manually selecting valve means to said second land of said pressure intensifying valve means, whereby the manually selecting valve means is changed from Drive position to Low position, said first conduit means is connected to said third conduit means to apply the line pressure to that side of said cut-back valve means which is opposite to the side subjected to the pressure of said output speed sensing means, and said first conduit means is disconnected from said second conduit mean to exhaust the line pressure applied to one side of said line pressure regulating valve means, thus increasing the line pressure to a value which is the same as that pressure maintained at a speed lower than the present vehicle speed, and said first conduit means is connected to said fourth conduit means to apply the line pressure to the end surface of said second land of said pressure intensifying valve means, thus further increasing the line pressure.

3. An automatic speed change control device for an automatic transmission of the type having a hydraulic torque converter, a driving shaft, a driven shaft, a planet gear train, hydraulic friction clutches and brakes; said speed change control device comprising a fluid pressure supply source driven by said driving shaft, a line pressure regulating valve means for regulating the pressure of the fluid supplied by said fluid pressure supply source, a line pressure intensifying valve means acting on one end of said line pressure regulating valve means to increase the line pressure, a fluid pressure operated valve means including a manually selecting valve means having a Drive position and a Low position, said fluid pressure operated valve means being connected with the output of said fluid pressure supply source, an engine load condition responsive means connected with the output of said fluid pressure supply source and with said line pressure intensifying valve means to vary the pressure of the operating fluid in response to changes in the engine load, said pressure intensifying valve means having a first land and a second land, the end surface of said first land being subjected to a pressure determined by said engine load condition sensing means, an output speed sensing means connected with said fluid pressure operated valve means, a pressure cut-back valve means connected with said line pressure regulating valve means and with said output speed sensing means to vary the pressure of said fluid supply in response to a pressure determined by said output speed sensing means, said fluid pressure operated valve means including a 1.2 shift valve means in communication with said output speed sensing means and with said engine load condition responsive means, said 1.2 shift valve means having first and second speed positions and being subjected at one end to a pressure from said output speed sensing means and at its other end to a spring force and to a reduced pressure from said engine load condition sensing means while in a first speed position when said manually selecting valve is in said Low position, a solenoid operated kick-down valve connected with said fluid pressure supply and with said 1.2 shift valve means for supplying line pressure to that end of said 1.2 shift valve means being subjected to a spring force upon actuation of said solenoid by fully depressing an engine accelerator pedal; a first conduit means connecting said pressure supply source to said manually selecting valve means, a second conduit means connecting said pressure cut-back valve means to another end of said line pressure regulating valve means, a third conduit means connecting said manually selecting valve means to that end of said cut-back valve means which is opposite to the end subjected to pressure from said output speed sensing means, and a fourth conduit means connecting said manually selecting valve means to the end surface of the second land of said pressure intensifying valve means, whereby when said manually selecting valve means is changed from Drive position to Low position said first conduit means is connected to said third conduit means to supply the line pressure to that side of said cutback valve means which is opposite the end subjected to pressure from said output speed sensing means and said first conduit means is disconnected from said second conduit means to exhaust the line pressure applied to one side of said line pressure regulating valve means, thus increasing the line pressure to a value which is the same as the pressure maintained at a speed lower than the present automobile speed and at the same time connecting said first conduit means to said fourth conduit means to apply the line pressure to the end surface of the second land of said pressure intensifying valve means to further increase the line pressure, so that when said 1.2 shift valve is in the second speed position, the line pressure cannot be introduced into said 1.2 shift valve means except under a kick-down condition, thus causing the speed change from the second speed to the first speed when said manually selecting valve is in the Low position to be the same as the speed change from the second speed to the first speed when said manually selecting valve is in the Drive position.

References Cited

UNITED STATES PATENTS

| | | | |
|---|---|---|---|
| 3,295,387 | 1/1967 | Leonard et al. | 74—864 |
| 3,308,676 | 3/1967 | Zundel et al. | 74—864 |
| 3,308,677 | 3/1967 | Van Lent et al. | 74—864 X |
| 3,309,939 | 3/1967 | Pierce | 74—864 |
| 3,310,991 | 3/1967 | Leonard | 74—864 |
| 3,336,815 | 8/1967 | Leonard | 74—864 |
| 3,362,261 | 1/1968 | Snyder et al. | 74—864 |
| 3,393,585 | 7/1968 | Pierce | 74—864 |

DONLEY, J. STOCKING, Primary Examiner

T. C. PERRY, Assistant Examiner

U.S. Cl. X.R.

74—869